United States Patent [19]

Hartmann

[11] 4,041,505
[45] Aug. 9, 1977

[54] AUTOMATIC ELECTRONIC RANGEFINDER

[75] Inventor: Rudolf Hartmann, Skokie, Ill.

[73] Assignee: Bell & Howell Company, Chicago, Ill.

[21] Appl. No.: 645,764

[22] Filed: Dec. 31, 1975

[51] Int. Cl.² .............................................. G03B 7/08
[52] U.S. Cl. .................................... 354/25; 250/201; 352/140; 356/3
[58] Field of Search .............. 354/25; 352/140; 356/4, 356/16; 350/6; 250/201, 229

[56] References Cited

U.S. PATENT DOCUMENTS

| | | | |
|---|---|---|---|
| 3,398,665 | 8/1968 | John, Jr. et al. | 356/4 |
| 3,784,305 | 1/1974 | Hartmann | 356/16 |
| 3,849,643 | 11/1974 | Takeda | 354/25 |

Primary Examiner—Russell E. Adams
Attorney, Agent, or Firm—James B. Blanchard; John E. Peele, Jr.; Gerald B. Epstein

[57] ABSTRACT

An automatic focusing system is provided to process amplitude and phase signals of image motion in an image plane. The camera includes a focusable objective lens, optical means, oscillating means, sensing means, and a servo. Light rays reflected from an object to be focused upon are received and refracted by the objective lens to the optical means which has a rear nodal point. The optical means receives and refracts the light rays to form an image of the object in an image plane. The optical means is oscillated about the rear nodal point by the oscillating means. While the optical means is being oscillated the image remains stationary in the image plane when the objective lens is focused upon the object, but is transversely displaced and oscillates in the image plane when the objective lens is not focused upon the object. The sensing means detects and processes amplitude and phase signals generated by image motion in the image plane and directs the servo to drive the objective lens into focus.

7 Claims, 3 Drawing Figures

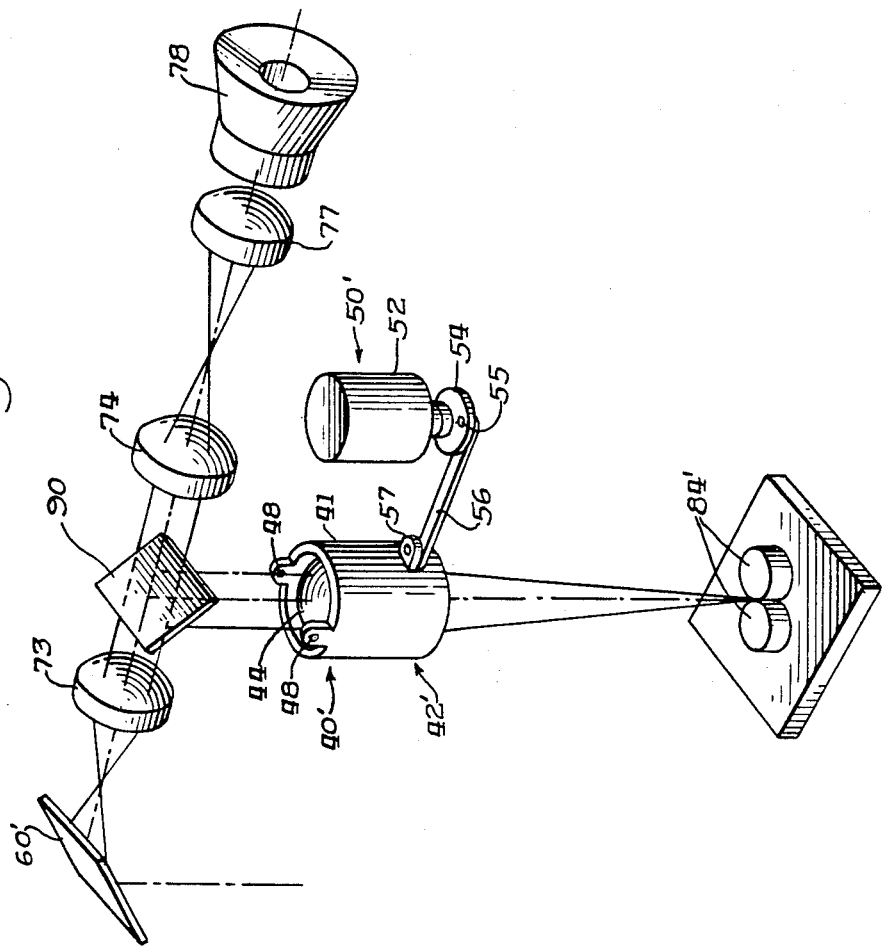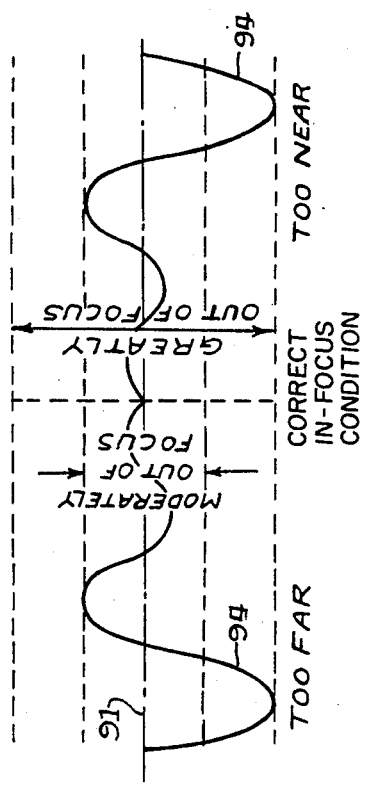

AUTOMATIC ELECTRONIC RANGEFINDER

BACKGROUND OF THE INVENTION

This invention relates to photographic apparatus and particularly to an automatic focusing system for a camera. The present invention is an improvement over the "Nodal Slide Rangefinder" disclosed and claimed in U.S. Pat. No. 3,784,305 assigned to the same assignee.

It is well known by those skilled in photographic apparatus art that all optical systems have front and rear nodal points. The above identified patent has described one effective use of the nodal points in a rangefinder apparatus for a camera. One characteristic of such nodal points includes the property that if light rays are directed toward the front nodal point at a given angle relative to the optical axis, the light rays will emerge from the rear nodal point at an equivalent angle. Assuming now an optical system in collimated space, if the lens of the optical system is oscillated about its rear nodal point, the image formed by the light rays will be independent of an unaffected by the angle of oscillation of the lens and will remain stationary in the image plane. However, assuming an optical system in a non-collimated space, if the lens of the optical system is oscillated about its rear nodal point, the image formed by the light rays will not be independent of the angle of oscillation of the lens, but will oscillate in the image plane. When the optical system is in a condition of focus, the image will not oscillate in the image plane. When the optical system is in a condition of out of focus, the image will oscillate in the image plane.

SUMMARY OF THE INVENTION

For use in photographic apparatus, an automatic focusing system is provided to process amplitude and phase signals of image motion in an image plane. The camera includes focusable objective lens means, optical means, oscillating means, sensing means, and servo means. Light ray reflected from an object to be focused upon are received and refracted by the objective lens means to the optical means which has a rear nodal point. The optical means receives and refracts the light rays to form an image of the object in an image plane. The optical means is oscillated about the rear nodal point by the oscillating means. While the optical means is being oscillated the image remains stationary in the image plane when the objective lens means is focused upon the object, but is transversely displaced and oscillates in the image plane when the objective lens means is not focused upon the object. The sensing means detects and processes amplitude and phase signals generated by image motion in the image plane and directs the servo means to drive the objective lens means into focus.

To understand this invention and the objects thereof, reference should be made to the accompanying drawings, wherein:

FIG. 2 is a waveform diagram of amplitude and phase signals generated by the image motion in the image plane as a function of focus of the objective lens; and FIG. 3 is a partial schematic view of another embodiment of the present invention including sampling of light rays in the viewfinder.

DETAILED DESCRIPTION OF THE INVENTION

Figure 1:
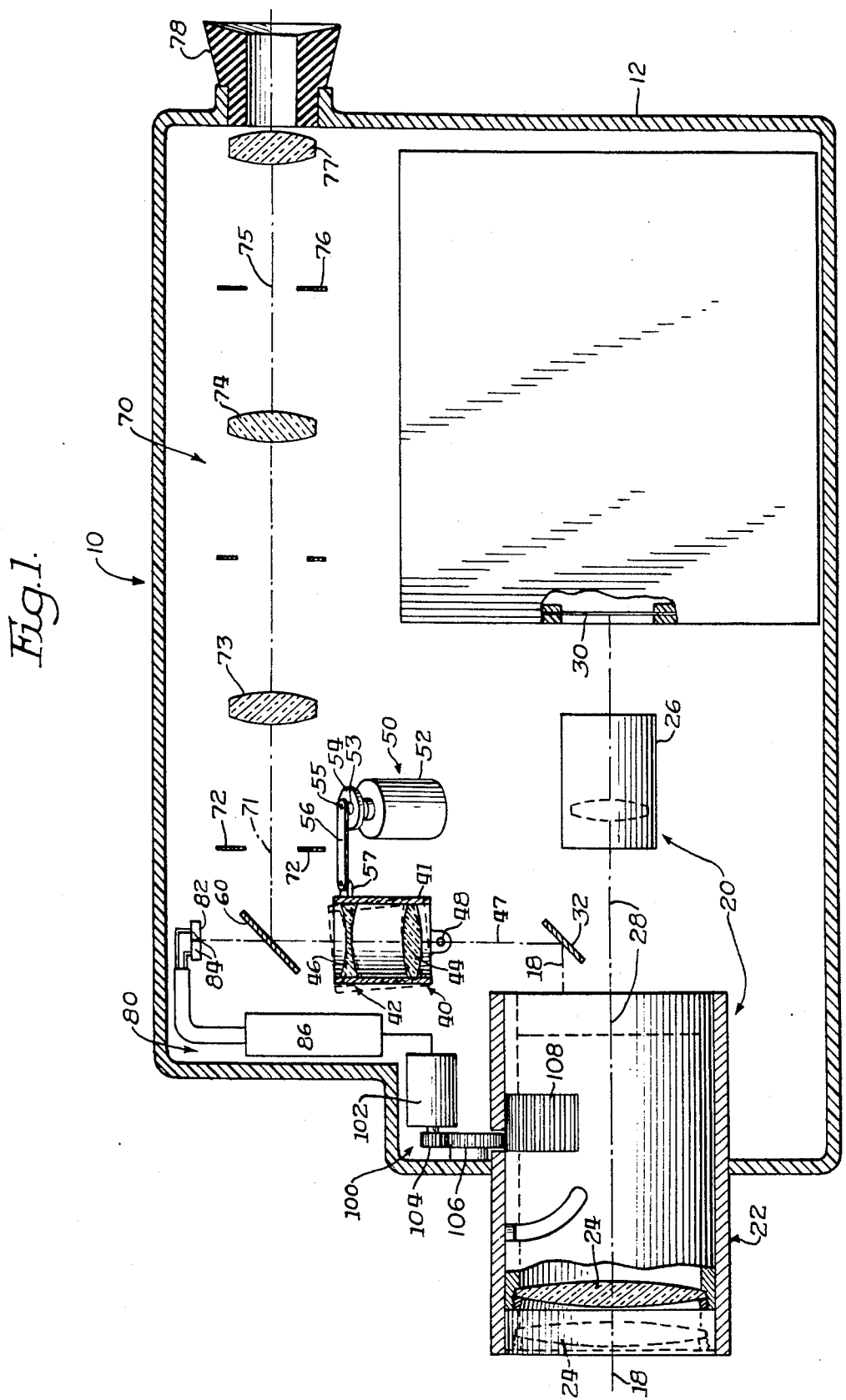
FIG. 1 is a schematic view of the components of the invention as applied to a camera having a variable focal length, focusable objective lens system.

Referring now to FIG. 1, there is shown a schematic view of photographic apparatus, such as a camera generally indicated by the reference numeral 10, having a housing 12 substantially enclosing the components of the camera 10. The components of the camera 10 include objective lens system 20, an optical ranging unit or apparatus 40, oscillating apparatus 50, sensing apparatus 80, and servo apparatus 100. These components comprising the camera 10 operate collectively to detect and process amplitude and phase signals of image motion in an image plane and to automatically focus the objective lens 20 of the camera 10 upon a remote object.

The objective lens system 20 is of the focusable, variable focal length type, having an afocal zoom unit 22 including a focusing member 24, and a prime unit 26. The objective lens system 20 is positioned on an optical axis 28 along which passes light radiation or light rays 18 reflected from a remote object (not shown) on which the lens is to be focused. The objective lens system 20 causes the light rays 18 to form an image on a film plane within the camera 10. The zoom unit 22, and more particularly the focusing member 24, receives and refracts the light radiation 18 reflected from the object to the prime unit 26. The position of the zoom unit 22 in relation to the distance of the object from the camera 10 determines the condition of focus of the lens system with respect to the film plane 30 and any other image planes formed within the camera 10. On the periphery of the mount retaining the zoom unit 22 is located gearing or the like which allows the zoom unit 22 to be manually focused by a person using the camera 10 or mechanically focused by the servo apparatus 100 which is described in more detail later. The prime unit 26 receives and refracts the light rays 18 from the zoom unit 22 to the film plane 30. Thus, the objective lens 20 receives and refracts the light radiation 18 to form an image on the film plane 30.

A light deflector, shown as a peek-in mirror 32, is positioned between the zoom unit 22 and the prime unit 26 of the objective lens system 20. Having the characteristic of reflecting light radiation of all frequencies, the peek-in mirror 32 is placed in the light path near the optical axis 28 to deflect a small portion of the light rays 18 from the path between the zoom unit 22 and the prime unit 26. More specifically, the peek-in mirror 32 is spaced from the optical axis 28 and is positioned at an angle of approximately 45 degrees with respect to the optical axis 28. By such arrangement, the peek-in mirror 32 sufficiently samples the light rays 18 forming the image of the object 16 on the film plane 30.

The optical ranging means 40 is positioned substantially vertically above the peek-in mirror 32 in the path of the reflected light radiation 18 from the peek-in mirror 32. This optical means 40 receives and refracts the light radiation 18 to form an image on a second image plane 82. The optical means 40 includes a barrel 41 and a ranging unit 42 having optical components which are supported in the barrel 41. The components of the ranging unit 42 may be any lens of the type known to persons skilled in the art. In the preferred embodiment, the unit includes a positive member 44 and a negative member 46, forming a telephoto-type lens with widely separated nodal points. The ranging unit 42 further has a front nodal point 47 and a rear nodal point 48 which are located at determinable positions with respect to the elements incorporated therein. After the light rays 18 are reflected from the peek-in mirror 32, the light rays 18 pass through the front and rear nodal points 47 and 48 and are received and refracted by the optical ranging unit 40 to the second image plane 82. The optical ranging unit 40 is adapted to oscillate cyclically about the rear nodal point 48 to image the light rays 18 on the second image plane 82.

When the optical ranging unit 40 is oscillated about the rear nodal point 48 and the objective lens 20 focused upon the object, the light rays 18 are received and refracted by the optical components 42 to form an image which is stationary in the second image plane 82. The image appears stationary since the light rays of the image are substantially aligned with the optical axis. When the optical ranging unit 40 is oscillated about the rear nodal point 48 and the objective lens 20 is not focused upon the object, the light rays 18 are received and refracted by the optical components 42 to form an image which is transversely displaced from the optical axis, and therefore, oscillates in the image plane 82. Thus, when the objective lens 20 is in a condition of focus on the object, the image in the image plane 82 is stationary, and when in a condition of out of focus, the image is not stationary but oscillates. In summary, the optical ranging unit 40 receives and refracts the light rays 18 to form an image which is either stationary or transversely displaced and oscillates in the second image plane 82.

The optical ranging unit oscillating apparatus 50 is positioned adjacent to the unit 40 and oscillates the barrel 41 cyclically about the rear nodal point 48 of the optical components unit 42. The oscillating apparatus 50 includes a motor 52 which is operably connected to the optical apparatus 40. The motor 52 is a small electric motor which is connected electrically to a power source and control unit (not shown). The motor 52 is operably connected mechanically to the optical apparatus 40 by an arm 56. The motor 52 includes a shaft 53 which has rigidly connected thereto a rotatable plate 54. The arm 56 is pivotably connected to the plate 54 by a pin 55, arranged radially of the motor shaft 53 for eccentric rotation of the arm 56. The arm 56 is rigidly attached to the barrel 41 of the optical ranging unit 40 by a coupling 57 positioned at the opposite end of the arm 56 from the connection to the plate When the motor 52 causes the plate 54 to rotate on the shaft 53, the arm 56 will cause the optical ranging unit 40 to oscillate about the nodal point 48. In the preferred embodiment, the motor 52 oscillates the optical apparatus 40 at a frequency of approximately 20 cycles per second so as to negate hand-held tremor, which usually peaks at about 10 cycles per second but may be higher or lower. In summary, the oscillating apparatus 50 causes the optical apparatus 40 to oscillate about the rear nodal point 48 which causes the received and refracted light rays 18 to form an image of the object in the second image plane 82 which remains stationary when the objective lens 20 is focused on the object and which when the objective lens 20 is not focused on the object.

A semi-reflecting mirror or beam splitter 60 is positioned substantially vertical above the optical ranging unit 40 in the path of light rays exiting therefrom. The purpose of the mirror 60, which transmits a portion of light while reflecting the rest, is to reflect a portion of the light from the path to the image plane 82 to a viewfinder system 70. Another type of mirror which could be utilized is an opaque mirror, which would have a central, small opening corresponding also to the focusing spot. If an opaque mirror were used, more light rays would be reflected to the viewfinder system 70, thus forming a brighter image for viewing.

The mirror 60 reflects a portion of the light to the viewfinder system 70 which is positioned between the optical device 40 and the sensing apparatus 80, and is substantially perpendicular to the optical path of the light rays 18 from the optical device 40. The portion of the light radiation 18 which is reflected to the viewfinder system 70 first images in a third image plane 71 which is defined by a mask or field stop 72. The distance between the mirror 60 and the second image plane 82 is equivalent to the distance between the mirror 60 and the third image plane 71. The viewfinder apparatus 70 includes first and second erector lenses 73 and 74 which are positioned in the optical path of the light rays 18 that are reflected by the mirror 60. The erector lenses 73 and 74 invert the light rays 18 as imaged in the third image plane 71, so that a viewer may see an erected image of the object in an eyepiece 78. The light rays 18 again are imaged in a fourth image plane 75 which is defined by the mask 76 and positioned in front of a lens 77 which further refracts the light rays 18. In summary, the viewfinder system 70 allows a viewer of the camera 10 to see the image of the object as imaged at either the second or third image planes 82 and 71.

The sensing apparatus 80 includes the second image plane 82 positioned substantially vertically above the mirror 60 of the camera 10. The portion of the light rays 18 transmitted by the mirror 60 to the second image plane 82 is imaged therein. When the lens of the camera 10 is in focus on the object, the image is stationary in the second image plane 82. When the lens of the camera 10 is not focused on the object, the image is transversely displaced and oscillates in the second image plane 82. Thus, motion of the image in the second image plane 82 indicates a condition of out of focus of the camera 10, while a stationary image in the second image plane 82 indicates a condition of focus of the camera 10.

Image motion in an image plane may be detected whereby a signal is generated which provides rangefinding information. If the camera 10 is in a condition of out of focus, a large amplitude of image motion in the image plane 82 will result. Further, if the camera 10 is in a condition of focus, zero amplitude of image motion in that image plane will result. As the camera 10 approaches a condition of focus from one direction, the zoom lens renders the condition of the light rays 18 more compatible with the rear nodal point 48 of the optical apparatus 40. As the camera approaches a condition of focus, the image motion in the image plane 82 will decrease and, correspondingly, the amplitude of image motion will decrease.

As shown in FIG. 2, the waveform attributable to amplitude signals have been plotted as a function of the condition of focus of the objective lens from far out of focus condition to in focus, and to out of focus. The line 91 indicates an amplitude signal of a stationary image in an image plane of a camera 10 which is in a condition of focus. The line 94 indicates an amplitude signal of an image transversely displaced and oscillating in an image plane of a camera as the objective lens of the camera is continuously adjusted from a condition of out-of-focus too far, through in-focus, to out-of-focus too near.

The image motion in the second image plane 82 generates signals which enable circuitry of the camera 10 to determine the direction of out-of-focus condition by determining the phase of the signals. That is, the signals indicate the camera 10 may be focused too far or too short relative to the object. As seen in FIG. 2, the direction of transverse image motion has been plotted as a function of the direction of oscillation of the optical apparatus and as a representation of phase of the signal. As the lens 20 approaches focus from an out of focus condition and goes beyond focus, the signal phase and the direction of transverse image motion will shift. Also, the amplitude of the signal will decrease before increasing as the phase shifts representing the opposite condition of out-of-focus of the lens.

The image motion of the image plane 82 thus enables the sensing apparatus 80 of the camera 10 to detect two parameters. First, the amplitude of image motion in the image plane 82 produces a signal which corresponds to the magnitude of the condition of out of focus. As the lens approaches focus, the amplitude of image motion in the image plane 82 will decrease and become zero at a condition of focus. As the lens passes through zero amplitude at a condition of focus, the image motion shifts in phase to indicate the other type of condition of out of focus of the lens. As the lens departs from a condition of focus, the amplitude of image motion in the image plane 82 will increase.

In the preferred embodiment, the sensing apparatus 80 further includes a photoelectric transducer 84. The light rays 18 reflected by the mirror 60 to the second image plane 82 impinges onto the transducer 84 positioned at the image plane 82 in a manner causing amplitude and phase signals to be generated by the transducer 84 in response to the image motion. The signals are detected by a signal processor 86 which is electronically connected to the transducer 84. The signal processor 86 processes the amplitude and phase signals of the image motion in the image plane 82 to detect maximum and minimum values as to amplitude and the relative shift of the signal time wise to detect the phase thereof.

Finally, in the preferred embodiment, the servo apparatus 100 is operably connected to the signal processor 84 and drives the focusing member of the zoom lens unit 22 in response to an electronic signal by the signal processor 84 to place the objective 20 in a condition of focus with respect to the object. The servo apparatus 100 includes an electric motor 102 which converts the electrical signal from the signal processor 86 into mechanical energy in a well-known manner. Upon energization, the motor 102 drives the focusing member of the zoom unit. In this embodiment, a circular gear 104 is arranged to cooperate through a transmission 106 with a gear 108 on the periphery of the zoom lens unit 22 to rotate the same. The rotation of the zoom unit 22 causes the focusing member 24 to move along the optical axis 28, thereby bringing the image of the object into focus on the several image planes in the camera.

When the photocells of the photoelectric transducer 84 receive identical quantities of light, the objective lens 20 is considered to be in-focus condition. However, if the quantity of light impinging on one photocell is greater than that impinging on the other hand, the image is not in in-focus condition since the light rays are not equally impinging onto the photocells as they would if parallel one with the other.

That is, the light rays impinge off center according to the direction in which the focus of the image is in error.

Referring to FIG. 2, the differential in waveform signals generated by the photocells is shown to vary in amplitude and phase as focus is approached and passed through. The photocells are arranged adjacent one another in the second image plane so that light rays of an image impinge thereon. In a well focused condition of the lens, the light rays impinge with equal intensity on both photocells. However, as the focus of the image lessens, greater differences occur in the signals generated by the photocells. That is, one photocell receives a greater quantity of light rays than does another. By switching from the output of one photocell to the output of the other, the phase of the differential waveform can be determined. That is, as the oscillating lens system causes the light rays to sweep across the boundary from one photocell to the other, the signal outputs are detectable. When the signal comparison indicates that the quantity of light on one photocell is greater than the quantity of light on the other, the differential signal indicates the condition of sharp focus to be in the direction causing the lesser signal.

Electronically, the objective lens focusing motor can be adjusted by variations in voltage generated by the differences between the light output of the photocells. In out of focus conditions voltage is supplied to the motor thereby causing the motor to be driven. As the focus condition is reached, less voltage is applied to the motor until the in-focus condition is acquired.

The subject matter to be imaged is selected with measurable contrast between portions thereof. As the image is reciprocably oscillated across the boundary between two photocells, a total quantity of light impinges on the photocells. This quantity of light is responsive to the averaged bright and dark portions of the image. As the subject matter being imaged changes, the resulting sum of the light values varies in a corresponding manner. However, as portions of the image move back and forth across the boundary a value can be determined by the difference between the sum of the outputs of both photocells and the difference between the output ratios of the respective photocells. That is, the ratio of the output difference to the sum of the outputs defines a value independent of variations of the output. Since the position of bright and dark areas does not alter the total value, the detector functions effectively as a nulling device. As the quantity of light impinging on the photocells balances or nulls, the condition of focus is acquired.

In an alternative embodiment according to this invention, as shown in FIG. 3, the light rays to be evaluated are deflected from the viewfinder light path. Between erector optics 73, 74 of the viewfinder light path, the light rays of the image generated by the objective lens 20 are again collimated. Hence, some of the light rays of the image can be deflected from this portion of the optical path for image processing. For example, a partially reflecting mirror 90 can deflect light rays from a totally reflecting mirror 60' to and through the ranging unit 40' and toward a photocell Unit 84' located in another image plane. An oscillating apparatus 50' oscillates the barrel 41 cyclically about the rear nodal point 48 of the optical components unit 42'. Since the ranging unit is not optically in the viewfinder light path, the disconcerning motion effects to the operator due to image motion or the like in through-the-ranging unit viewing systems is avoided. That is, the operator sees a steady image as in the conventional viewfinder, regardless of the out-of-focus condition of the objectives. Further, higher magnification optics may be incorporated in the ranging unit to provide more widely separated nodal points that might be expected. Also, the optics of the ranging unit may be selected to enable evaluating of a smaller angle of view within the total view of the scene being photographed.

In summary, the sweeping function of the oscillating lens system causes the image to reciprocably move back and forth from one photocell to the other across the boundary therebetween. When the image is in an out-of-focus condition, the magnitude of the image displacement on each photocell is greater than when the image is in focus. As the optical means is oscillated, the magnitude of the image displacement changes cyclically in accordance with the frequency of oscillation. As the objective lens is adjusted toward focus, the magnitude of image displacement changes progressively, producing a change of the signals of each of the photocells, ultimately becoming zero at focus. If the "in-focus" condition is passed, the phase of the photocell output signals shifts by 180°, indicating that the objective lens is being moved away from a condition of focus. Eventually a minimum image displacement is recorded indicating an "in-focus" condition.

While the embodiment described herein is at present considered to be preferred, it is understood that various modifications and improvements may be made therein, and it is intended to cover in the appended claims all such modifications and improvements as fall within the true spirit and scope of the invention.

What I claim is:

1. In an automatic focusing system for use in photographic apparatus comprising:
    focusable objective lens means for receiving and refracting light radiation reflected from an object to be focused upon;
    optical means having a rear nodal point for receiving and refracting the light radiation from the objective lens means through the rear nodal point to form an image in an image plane;
    oscillating means for oscillating the optical means about the rear nodal point, whereby the image is cyclically displaced at the frequency of said oscillation means when the image is out of focus, the magnitude of said image displacement being proportional to the degree that the image is out of focus;
    sensing means including at least one photocell means displaced from the central axis of the light radiation refracted from said optical means for sensing said cyclical image displacement to provide an image displacement signal having an amplitude indicative of the magnitude of said image displacement and having a phase indicative of the direction in which said objective lens means is out of focus with respect to said object;
    processing means responsive to said sensing means to provide an output signal which indicates the amount and direction said objective lens means must be moved to bring the image into focus; and
    servo means responsive to the output signal for moving the objective lens means to bring the image into focus.

2. In an automatic focusing system for use in photographic apparatus comprising:
    focusable objective lens means for receiving and refracting light radiation reflected from an object to be focused upon;
    reflecting means for reflecting the light radiation from the objective lens means;
    optical means having a rear nodal point for receiving and refracting the light radiation from the reflecting means through the rear nodal point to form an image in an image plane;
    oscillating means for oscillating the optical means about the rear nodal point, whereby the image is cyclically displaced at the frequency of said oscillation means when the image is out of focus, the magnitude of said image displacement being proportional to the degree that the image is out of focus;
    sensing means including at least one photocell means displaced from the central axis of the light radiation refracted from said optical means for sensing said cyclical image displacement to provide an image displacement signal having an amplitude indicative of the magnitude of said image displacement and having a phase indicative of the direction in which said objective lens means is out of focus with respect to said object;
    processing means responsive to said sensing means to provide an output signal which indicates the amount and direction said objective lens means must be moved to bring the image into focus; and
    servo means responsive to the output signal for moving the objective lens means to bring the image into focus.

3. In an automatic focusing system for use in photographic apparatus comprising:
    focusable objective lens means for receiving and refracting light radiation reflected from an object to be focused upon;
    reflecting means for reflecting the light radiation from the objective lens means;
    optical means having a rear nodal point for receiving and refracting the light radiation from the reflecting means through the rear nodal point;
    transmission means for transmitting a portion of the light radiation refracted by the optical means to form an image in an image plane, the transmission means further diverting a portion of the light radiation refracted by the optical means to a viewfinder means;
    oscillating means for oscillating the optical means about the rear nodal point, whereby the image is cyclically displaced at the frequency of said oscillation means when the image is out of focus, the magnitude of said image displacement being proportional to the degree that the image is out of focus;
    sensing means including at least one photocell means displaced from the central axis of the light radiation refracted from said optical means for sensing said cyclical image displacement to provide an image displacement signal having an amplitude indicative of the magnitude of said image displacement and having a phase indicative of the direction in which said objective lens means is out of focus with respect to said object;
    processing means responsive to said sensing means to provide an output signal which indicates the amount and direction said objective lens means must be moved to bring the image into focus; and
    servo means responsive to the output signal for moving the objective lens means to bring the image into focus.

4. The automatic focusing system as in claim 3 wherein the oscillating means oscillates the optical means at a frequency of at least 20 cycles per second.

5. The automatic focusing system as in claim 3 wherein said sensing means includes two photocell means displaced from the central axis of the light radiation refracted from said optical means for sensing said cyclical image displacement so that each of said photocell means provides an image displacement signal.

6. The automatic focusing system as in claim 5 wherein said output signal comprises the ratio of the difference of image displacement signals of both photocell means to the sum of the image displacement signals of both photocell means, whereby said output signal is substantially independent of image intensity.

7. An automatic focusing system for use in photographic apparatus comprising:

focusable objective lens means for receiving and refracting light radiation reflected from an object to be focused upon;

reflecting means for reflecting the light radiation from the objective lens means;

transmission means for transmitting a first collimated portion of the light radiation reflected by the reflecting means to a viewfinder means, the transmission means further diverting a second collimated portion of the light radiation reflected by the reflecting means, whereby the second portion can be used to focus said objective lens means without altering the first portion transmitted to the viewfinder means;

optical means having a rear nodal point for receiving and refracting said second collimated portion of the light radiation through the rear nodal point to form an image in an image plane;

oscillating means for oscillating the optical means about the rear nodal point, whereby the image is cyclically displaced at the frequency of said oscillation means when the image is out of focus, the magnitude of said image displacement being proportional to the degree that the image is out of focus;

sensing means including at least one photocell means displaced from the central axis of the light radiation refracted from said optical means for sensing said cyclical image displacement to provide an image displacement signal having amplitude indicative of the magnitude of said image displacement and having a phase indicative of the direction in which said objective lens means is out of focus with respect to said object;

processing means responsive to said sensing means to provide an output signal which indicates the amount and direction said objective lens means must be moved to bring the image into focus; and servo means responsive to an output of the sensing means for driving the objective lens means to bring the image into focus.

* * * * *